Oct. 5, 1926.

L. MAUCH ET AL 1,601,975

DANDELION REMOVER

Filed March 27, 1926

Inventors
Louis Mauch,
Milfred Mauch.
By A. J. O'Brien
Attorney

Patented Oct. 5, 1926.

1,601,975

UNITED STATES PATENT OFFICE.

LOUIS MAUCH AND MILFRED MAUCH, OF DENVER, COLORADO.

DANDELION REMOVER.

Application filed March 27, 1926. Serial No. 97,854.

This invention relates to improvements in apparatus for removing dandelion roots from lawns.

It is well known that one of the most difficult pests that the average householder has to contend with in the maintenance of his lawn is the dandelion. These plants seem to flourish in spite of ever effort that is made to discourage their growth and to exterminate them. Nothing seems to be effective in removing this lawn pest except extraction from the ground, root and all.

We are aware that many efforts have been made to provide suitable tools by means of which dandelion roots may be removed from the soil and we do not therefore claim to be the first to have conceived this idea in its broadest aspect. We have, however, designed a specific tool for this purpose which we believe to be especially well adapted for the use for which it is intended and which is of such simple construction that it can be cheaply made and which, at the same time, can be easily operated and is very effective in its operation.

Our invention briefly described consists in a rod having a handle at one end and having the other end pointed so that it may be readily inserted into the ground near a dandelion root. Secured to the pointed end is a pawl like member which is pivoted to the bar in such a manner that it will move into a position substantially parallel with the axis of the bar which position it will assume when the bar is inserted into the ground but which will move out into a position approaching right angles, with respect to the axis of the bar, when the latter is moved in an upward direction whereby the prongs of the pawl will engage the root of the dandelion and extract the same from the soil.

It may be mentioned here that before the dandelions are to be removed by means of the implement which will shortly be described in detail, it is preferable that the lawn shall be given a thorough soaking so that the soil will be moist whereby less force is required in performing the desired operation.

Having now briefly described our invention, we shall proceed to describe the same in detail and reference for this purpose will be had to the accompanying drawing on which the preferred embodiment of the invention has been illustrated and in which.

Figure 1:
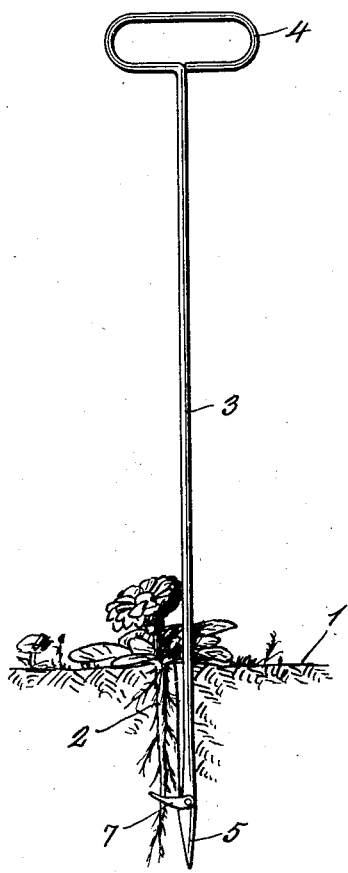
Figure 1 is a side elevation of the tool forming the subject of this invention and showing also a section through the ground whereby the relationship of the tool to the dandelion root is disclosed.
Figure 2:
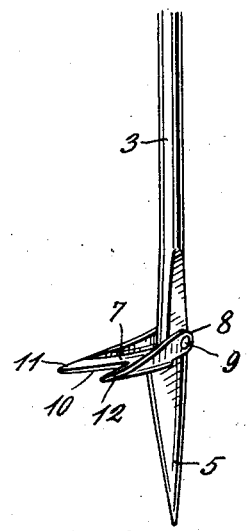
Figure 2 is a perspective view showing the lower end of the tool with the root engaging pawl in operative position.
Figure 3:
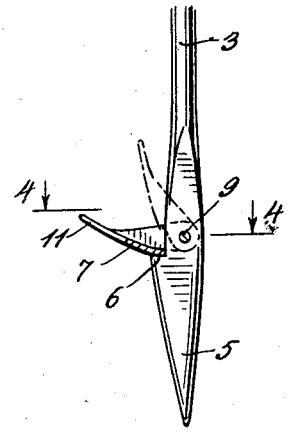
Figure 3 is a section taken on line 3—3, Figure 4, and shows the root engaging pawl in operative position, being shown by dot and dash lines.
Figure 4:
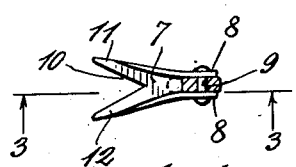
Figure 4 is a section taken on line 4—4, Figure 3.

In the drawing the upper surface of the soil or lawn has been indicated by reference numeral 1 and a dandelion root by reference numeral 2. Our improved dandelion removing tool comprises a bar 3 one end of which is bent into an oblong loop 4 which serves as a handle, the other end has a conical tapering point 5, one side of which is notched so as to provide a shoulder 6 which forms a stop for the pawl 7. This pawl is preferably formed from one piece of material and has two spaced ears 8 that are parallel with each other and lie in planes substantially perpendicular to the plane of the main portion of the pawl. These ears are perforated for the reception of the pivot pin 9 that passes through the openings in the ends and through corresponding openings in the bar 3. The pawl has a triangular notch 10 that extends inwardly from the outer end thereof and divides the pawl into two prongs which have been indicated by numerals 11 and 12. The pawl may be moved into the position shown by dotted lines in Figure 3 which position it assumes when the tool is being inserted into the ground. This reduces the resistance to a minimum. After the tool has been inserted to a sufficient depth to engage the dandelion root near the lower end thereof an upward movement of the bar 3 will cause the pawl to move into the full line position shown in Figure 3 and illustrated also in Figure 1. If proper care has been taken in inserting the tool, the prongs 11 and 12 will engage the sides of the root 2 so that when the upward movement of the bar 3 is continued, the entire dandelion root will be extracted in a manner clearly apparent from the drawing.

It is evident from the above description that by means of the simple tool described above, dandelions may quickly and easily be removed from the lawn, root and all, and in this way it is possible to entirely clear lawns of this disagreeable pest. As pointed out above, in order to facilitate the work, the ground should be thoroughly moistened before this operation is undertaken as it is evident that the tool can be more readily inserted into the moist ground than into the hard ground and at the same time it is easier to remove the roots under such conditions.

We want to call particular attention to the advantages of having the pawl 7 pivoted to the tool as it might be argued that a pawl of a similar construction formed integral to the tool would be the equivalent of the one here illustrated. The reason why a pawl pivoted as shown is desirable is that in the first place the resistance offered to the insertion of the tool is thereby greatly lessened and it enables the tool to be inserted very close to the root and at the same time when the tool is withdrawn the plate will extend outwardly so as to project farther from the axis of the bar 3 than it occupied in the collapsed position which makes it more positive in its action than if it were not pivoted in the manner shown and besides this it greatly simplifies the manufacture of the tool and therefore cheapens its construction so as to make it possible to manufacture and sell the tool at a price that brings it within the reach of all who may have use for it.

Having now described our invention what we claim as new is:

A tool for removing weed roots from the soil which comprises, in combination, a rod having one end pointed and adapted to be inserted into the ground in close proximity to a weed root and a pawl pivoted to the rod near the pointed end so as to be rocked about its pivot from a position substantially parallel with the rod downwardly and outwardly to a position substantially at right angles to the axis of the rod, means for limiting the downward movement of said pawl, one end of said pawl having spaced parallel ears adapted to embrace the rod, said ears being perforated for the reception of a pivot pin and the other end being forked.

In testimony whereof we affix our signatures.

LOUIS MAUCH.
MILFRED MAUCH.